(12) United States Patent
Jin et al.

(10) Patent No.: US 8,557,923 B2
(45) Date of Patent: Oct. 15, 2013

(54) THERMOPLASTIC RESIN COMPOSITION HAVING EXCELLENT LOW GLOSS CHARACTERISTIC AND SCRATCH RESISTANCE, AND METHOD FOR PREPARING THE SAME

(75) Inventors: Young Sub Jin, Seoul (KR); Hwan Seok Park, Anyang-si (KR); Jae Keun Hong, Gunpo-Si (KR); Sung Kwan Kim, Gunpo-Si (KR); Ho Ryong Sun, Yeosu-si (KR); Byeong Do Lee, Gwangju (KR); Kyung Jong Lee, Suwon-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 12/344,670

(22) Filed: Dec. 29, 2008

(65) Prior Publication Data
US 2009/0171028 A1 Jul. 2, 2009

(30) Foreign Application Priority Data

Dec. 28, 2007 (KR) ................. 2007-140120

(51) Int. Cl.
*C08L 33/08* (2006.01)
*C08L 33/10* (2006.01)
*C08L 9/00* (2006.01)

(52) U.S. Cl.
USPC ............ 525/230; 525/53; 525/191; 525/238; 525/241; 525/310

(58) Field of Classification Search
USPC ............ 525/53, 54, 191, 230, 238, 241, 310, 525/316, 243
See application file for complete search history.

(56) References Cited

U.S. PATENT DOCUMENTS

| | | | |
|---|---|---|---|
| 2,929,795 A | 3/1960 | Reid et al. | |
| 3,260,772 A | 7/1966 | Cummings | |
| 3,354,238 A | 11/1967 | Schmitt et al. | |
| 3,919,157 A | 11/1975 | Ide et al. | |
| 4,097,555 A | 6/1978 | Moran | |
| 4,652,614 A | 3/1987 | Eichenauer et al. | |
| 4,668,737 A | 5/1987 | Eichenauer et al. | |
| 5,237,004 A | 8/1993 | Wu et al. | |
| 5,475,053 A | 12/1995 | Niessner et al. | |
| 5,891,962 A * | 4/1999 | Otsuzuki et al. | 525/316 |
| 6,448,342 B2 | 9/2002 | Kurata et al. | |
| 2007/0203293 A1 | 8/2007 | Ahn et al. | |

FOREIGN PATENT DOCUMENTS

| | | |
|---|---|---|
| GB | 1203957 A | 9/1970 |
| GB | 1291897 A | 10/1972 |
| GB | 2364706 A * | 2/2002 |
| WO | WO-2008020703 A1 * | 2/2008 |

OTHER PUBLICATIONS

European Search Report in counterpart European Application No. 08021544, dated Feb. 18, 2009.

* cited by examiner

*Primary Examiner* — Irina S Zemel
*Assistant Examiner* — Jeffrey Lenihan
(74) *Attorney, Agent, or Firm* — Summa, Additon & Ashe, P.A.

(57) ABSTRACT

Disclosed herein is a thermoplastic resin composition having excellent scratch resistance and a method for preparing the same. The thermoplastic resin composition comprises (A) about 80 to about 95% by weight of a terpolymer of (meth) acrylic acid alkyl ester-aromatic vinyl-cyanide vinyl compound; and (B) about 5 to about 20% by weight of a butadiene rubber.

17 Claims, 2 Drawing Sheets

THERMOPLASTIC RESIN COMPOSITION HAVING EXCELLENT LOW GLOSS CHARACTERISTIC AND SCRATCH RESISTANCE, AND METHOD FOR PREPARING THE SAME

CROSS-REFERENCE TO RELATED APPLICATION

This application claim priority from Korean Patent Application No. 10-2007-140120 filed on Dec. 28, 2007 in the Korean Intellectual Property Office, the disclosure of which is incorporated herein by reference in its entirety.

FIELD OF THE INVENTION

The present invention relates to a thermoplastic resin composition having excellent low gloss characteristic and scratch resistance, and a method for preparing the same.

BACKGROUND OF THE INVENTION

Generally, an ABS (acrylonitrile-butadiene-styrene) resin has a good balance of properties such as processability, rigidity, chemical resistance, impact resistance, and the like such that it has been widely used for various products such as automobiles, electrical/electronic appliances, office automation (OA) devices, toys, stationery, and the like. Recently, demand for a thermoplastic resin with superior scratch resistance is increasing as the use of thermoplastic resin without a coating to protect the environment is becoming a widespread trend. There is also a need for a thermoplastic resin with low gloss as customers increasingly prefer products with a high quality appearance.

Generally, ABS resin includes butadiene based rubber to improve impact resistance. However, the butadiene based rubber substantially lowers scratch resistance, which increases the susceptibility of final molded articles to damage from scratching during transport. Further, a conventional ABS resin does not provide a high quality appearance since it is too glossy.

U.S. Pat. No. 6,448,342 discloses a method stated to improve transparency of a butadiene based rubber reinforced resin by grafting vinyl compound, cyanide vinyl compound, and alkyl methacrylate with a butadiene rubber having a average particle size ranging from 150 to 350 nm and a specific rubber particle size distribution.

U.S. Patent Publication No. 2007-0203293 discloses a compounding method using a block copolymer comprising an acrylate-styrene-acrylonitrile graft copolymer, an aromatic vinyl compound-cyanide vinyl compound copolymer, an aromatic vinyl compound-cyanide vinyl compound-alkyl methacrylate terpolymer, and a di-block copolymer (aromatic vinyl compound/cyanide vinyl compound-alkyl methacrylate/aromatic vinyl compound/cyanide vinyl compound). However, the resins of the foregoing patents still have disadvantages, including insufficient scratch resistance (B level or so scratch resistance measured in terms of pencil hardness) and high glossy appearance.

U.S. Pat. Nos. 5,475,053 and 4,652,614 disclose a method for lowering resin gloss by using a spherical graft copolymer as a matting agent.

Additionally, U.S. Pat. Nos. 4,668,737 and 5,237,004 disclose a method for lowering resin gloss by using a spherical rubber particle having a core/shell structure of 0.05 to 20 μm or 2 to 15 μm.

However, the use of additives can cause exfoliation, deterioration of physical properties, and partial high gloss, in addition to increasing production costs. Further, when using a rubber particle, the resins may have low gloss but also low scratch resistance.

As described above, although there has been many attempts to obtain low gloss characteristic while maintaining high scratch resistance, it has been difficult to improve both scratch resistance and low gloss characteristic at the same time since high scratch resistance is usually accompanied by high gloss, and, conversely, low scratch resistance is accompanied by low gloss.

SUMMARY OF THE INVENTION

The present inventors have developed a thermoplastic resin composition having excellent scratch resistance. Further, the thermoplastic resin composition of the invention can have excellent low gloss characteristic. In addition, the thermoplastic resin composition can have both excellent low gloss and good scratch resistance, while maintaining impact strength.

The thermoplastic resin composition of the invention comprises a spherical butadiene rubber as a dispersed phase and a terpolymer of (meth)acrylic acid alkyl ester, aromatic vinyl compound and cyanide vinyl compound as a continuous phase. In exemplary embodiments, the thermoplastic resin composition of the present invention having excellent low gloss characteristic and scratch resistance comprises (A) about 80 to about 95% by weight of a terpolymer of (meth)acrylic acid alkyl ester-aromatic vinyl-cyanide vinyl compound; and (B) about 5 to about 20% by weight of a butadiene rubber.

In exemplary embodiments of the present invention, the terpolymer of (meth)acrylic acid alkyl ester-aromatic vinyl-cyanide vinyl compound (A) forms a continuous phase, and the butadiene rubber (B) forms a dispersed phase in the form of substantially spherical particles.

In exemplary embodiments of the present invention, the dispersed phase may further comprise butadiene-(meth)acrylic acid alkyl ester-aromatic vinyl-cyanide vinyl copolymer, butadiene-aromatic vinyl-cyanide vinyl copolymer or a combination thereof.

In an exemplary embodiment of the present invention, the butadiene rubber may have an average particle diameter of about 1 to about 10 μm. In another exemplary embodiment of the present invention, the butadiene rubber may have an average particle diameter of about 1.5 to about 6 μm.

The butadiene rubber may be polybutadiene, styrene-butadiene rubber or a mixture thereof. The styrene-butadiene rubber may have about 20% by weight or less of styrene. In an exemplary embodiment, the styrene-butadiene rubber may have about 15% by weight or less of styrene. In another exemplary embodiment, the styrene-butadiene rubber may have about 10% by weight or less of styrene.

In an exemplary embodiment, the terpolymer of the (meth)acrylic acid alkyl ester-aromatic vinyl-cyanide vinyl compound (A) may comprise about 70 to 90% by weight of (meth)acrylic acid alkyl ester, about 5 to about 20% by weight of an aromatic vinyl compound, and about 1 to about 10% by weight of a cyanide vinyl compound. In another exemplary embodiment, the terpolymer (A) may comprise about 77 to 90% by weight of (meth)acrylic acid alkyl ester, about 7 to about 17% by weight of an aromatic vinyl compound, and about 3 to about 7% by weight of a cyanide vinyl compound.

In exemplary embodiments, the terpolymer of (meth) acrylic acid alkyl ester-aromatic vinyl-cyanide vinyl compound (A) may have a weight average molecular weight of about 60,000 to about 150,000.

The present invention also provides a novel method for preparing the thermoplastic resin composition having excellent low gloss characteristic and scratch resistance. In exemplary embodiments, the method of the invention is a continuous bulk polymerization method. The method of the invention can prepare the thermoplastic resin composition efficiently and stably.

The method comprises preparing a reaction solution by mixing a monomer mixture comprising (meth)acrylic acid alkyl ester, an aromatic vinyl compound and a cyanide vinyl compound with butadiene rubber; and polymerizing the reaction solution by continuously introducing the reaction solution into a plurality of serially connected reactors under conditions sufficient to result in a final conversion rate of the monomer mixture of about 50 to about 70%.

The monomer mixture comprises about 70 to about 90% by weight of (meth)acrylic acid alkyl ester, about 5 to about 20% by weight of an aromatic vinyl compound, and about 1 to about 10% by weight of a cyanide vinyl compound.

In exemplary embodiments, the reaction solution comprises about 87 to about 97% by weight of a monomer mixture and about 3 to about 13% by weight of a butadiene rubber.

The butadiene rubber may have a solution viscosity of about 25 to about 100 cps in 5% styrene solution.

In exemplary embodiments, the plurality of reactors comprises 2 to 5 reactors.

The thermoplastic resin composition of the present invention may have a pencil hardness of HB or more, a scratch width of about 310 μm or less measured by a Ball-type Scratch Profile, and a gloss of about 60 or less measured using a 60 degree gloss meter.

DETAILED DESCRIPTION OF THE INVENTION

Figure 1:
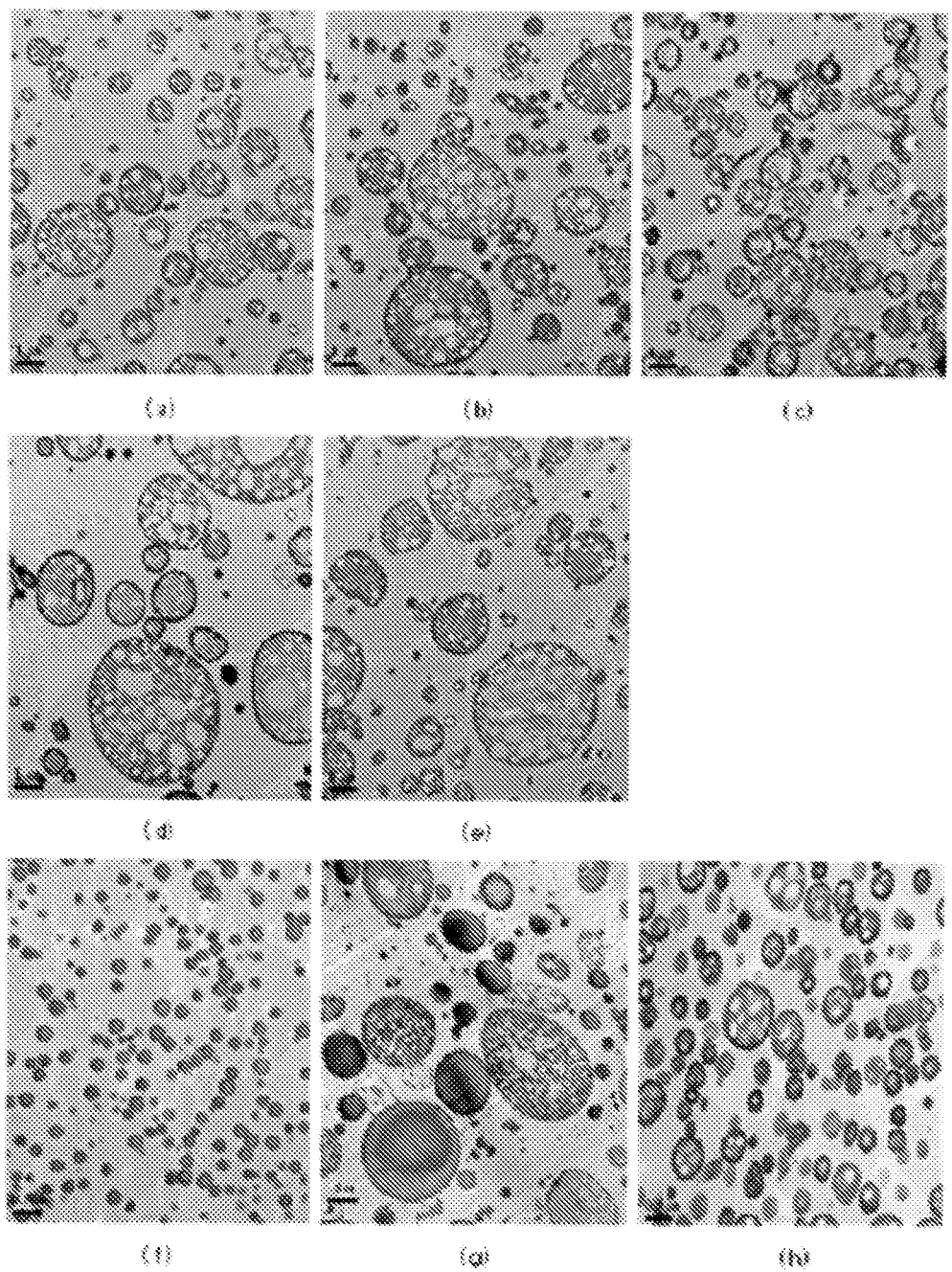
FIGS. 1(a)-(e) are TEM images showing the thermoplastic resin compositions prepared in Examples 1-5.
FIGS. 1(f)-(h) are TEM images showing the thermoplastic resin compositions prepared in Comparative Examples 1-3.
Figure 2:
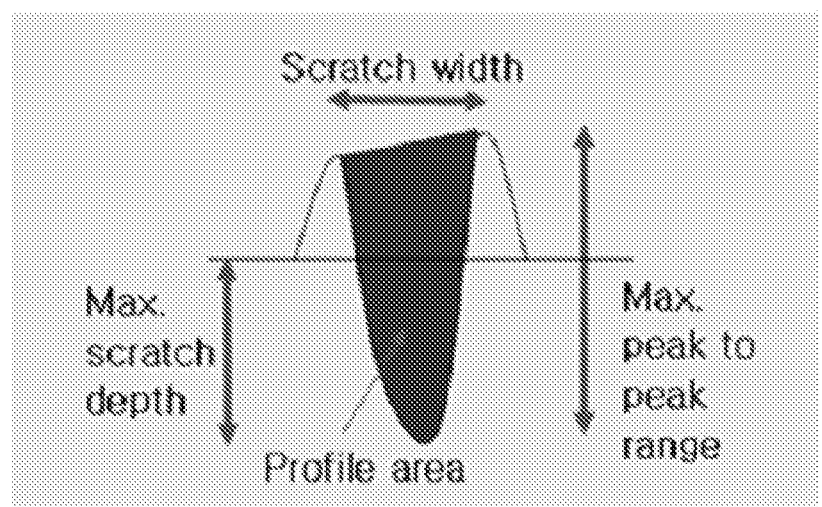
FIG. 2 is a diagram for determining the scale of scratch resistance from the measured Scratch Profile.

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

An aspect of the present invention provides a thermoplastic resin composition having excellent low gloss characteristic and scratch resistance. The thermoplastic resin composition of the present invention comprises (A) a terpolymer of (meth)acrylic acid alkyl ester-aromatic vinyl-cyanide vinyl compound; and (B) a butadiene rubber. In an exemplary embodiment, the thermoplastic resin composition may comprise (A) about 80 to about 95% by weight of a terpolymer of (meth)acrylic acid alkyl ester-aromatic vinyl-cyanide vinyl compound; and (B) about 5 to about 20% by weight of a butadiene rubber. In another exemplary embodiment, the thermoplastic resin composition may comprise (A) about 85 to about 93% by weight of a terpolymer of (meth)acrylic acid alkyl ester-aromatic vinyl-cyanide vinyl compound; and (B) about 7 to about 15% by weight of a butadiene rubber.

In an exemplary embodiment, the terpolymer of (meth)acrylic acid alkyl ester-aromatic vinyl-cyanide vinyl compound (A) forms a continuous phase, and the butadiene rubber (B) forms a dispersed phase in the form of substantially spherical particles. In another exemplary embodiment, the dispersed phase may comprise butadiene-(meth)acrylic acid alkyl ester-aromatic vinyl-cyanide vinyl copolymer, butadiene-aromatic vinyl-cyanide vinyl copolymer or a combination thereof.

The terpolymer of (meth)acrylic acid alkyl ester-aromatic vinyl-cyanide vinyl compound (A) which forms a continuous phase of the thermoplastic resin composition may comprise about 70 to 90% by weight of (meth)acrylic acid alkyl ester, about 5 to about 20% by weight of an aromatic vinyl compound, and about 1 to about 10% by weight of a cyanide vinyl compound. When these components are used in outside of those above ranges, it may be difficult to obtain scratch resistance desired in the present invention. In exemplary embodiments, the terpolymer (A) may comprise about 77 to 90% by weight of (meth)acrylic acid alkyl ester, about 7 to about 17% by weight of an aromatic vinyl compound, and about 3 to about 7% by weight of a cyanide vinyl compound.

The (meth)acrylic acid alkyl ester may be a $C_1$-$C_{10}$ alkyl (meth)acrylate. As used herein, the term "(meth)acrylic acid alkyl ester" refers to both $C_1$-$C_{10}$ alkyl acrylates and $C_1$-$C_{10}$ alkyl(meth)acrylates. Examples of the (meth)acrylic acid alkyl ester may include, but are not limited to, methyl methacrylate, ethyl methacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, and the like. These can be used alone or in combination with one another. The (meth)acrylic acid alkyl ester may be used in an amount of about 70 to 90% by weight, for example about 75 to about 89% by weight, and as another example about 80 to about 89% by weight per 100% by weight of the terpolymer (A).

Examples of the aromatic vinyl compound may include, but are not limited to, styrene, α-methyl styrene, p-methyl styrene, and the like, and these aromatic vinyl compounds can be used alone or in combination with one another. The aromatic vinyl compound may be used in an amount of about 5 to 20% by weight, for example about 7 to about 17% by weight, and as another example about 7.5 to about 15% by weight, per 100% by weight of the terpolymer (A).

Examples of the cyanide vinyl compound may include, but are not limited to, acrylonitrile, methacrylonitrile, ethacrylonitrile, and the like. These cyanide vinyl compounds can be used alone or in combination with one another. The cyanide vinyl compound may be used in an amount of about 1 to about 10% by weight, for example about 2 to about 8% by weight, and as another example about 3 to about 7% by weight, per 100% by weight of the terpolymer (A). In exemplary embodiments, the cyanide vinyl compound may be used in an amount of about 3.5 to about 5.5% by weight.

The terpolymer of (meth)acrylic acid alkyl ester-aromatic vinyl-cyanide vinyl compound (A) which forms a continuous phase may have a weight average molecular weight (Mw) of about 60,000 to about 150,000, for example about 80,000 to about 125,000, and as another example about 83,000 to about 120,000. If the weight average molecular weight of a continuous phase is less than about 60,000, scratch resistance and impact strength may be markedly deteriorated, because the viscosity of the rubber phase can be significantly larger than that of the continuous phase, which can result in the formation of a rubber phase having an average particle diameter of 10 μm or more. In contrast, if the weight average molecular weight of a continuous phase is more than about 150,000, low gloss may not be obtained, because the viscosity of the continuous phase can be significantly larger than that of the rubber phase, which can result in the formation of a rubber phase having an average particle diameter of 1 μm or less.

The butadiene rubber (B) may be polybutadiene, styrene-butadiene rubber or a combination thereof. The styrene-butadiene rubber may include styrene in a range of about 20% by weight or less. In an exemplary embodiment, the styrene-butadiene rubber may have styrene in a range of about 15% by weight or less. In another exemplary embodiment, the styrene-butadiene rubber may have styrene in a range of about 10% by weight or less.

In exemplary embodiments, the butadiene rubber (B) may have an average particle diameter of about 1 to about 10 μm, for example about 1.5 to about 8 μm, and as another example about 3 to about 6 μm. If the average particle diameter is less than about 1 μm, gloss may be higher and if the average particle diameter is more than about 10 μm, scratch resistance and impact strength may be deteriorated. In exemplary embodiments, the butadiene rubber (B) may have an average particle diameter of about 1.5 to about 6 μm.

The thermoplastic resin composition of the present invention can be prepared by various conventional methods but advantageously is prepared by a continuous bulk polymerization. In case of conventional methods such as emulsion polymerization, suspension polymerization, and the like, it may not be easy to stably prepare a spherical rubber phase having the aforementioned size of about 1 to about 10 μm, and thus one may need to prepare a terpolymer for the continuous phase separately and then use a melt-extruding process. Therefore, those conventional methods are not efficient for preparing the thermoplastic resin composition having excellent low gloss characteristic and scratch resistance.

Accordingly, the present invention provides a novel method for preparing the thermoplastic resin composition having excellent low gloss characteristic and scratch resistance.

The method comprises preparing a reaction solution by mixing a monomer mixture comprising (meth)acrylic acid alkyl ester, an aromatic vinyl compound and a cyanide vinyl compound with butadiene rubber; and polymerizing the reaction solution by continuously introducing the reaction solution into a continuous polymerization reactor in which a plurality of reactors are serially connected under conditions sufficient to result in a final conversion rate of the monomer mixture of about 50 to about 70%.

The monomer mixture comprises about 70 to about 90% by weight of (meth)acrylic acid alkyl ester, about 5 to about 20% by weight of an aromatic vinyl compound, and about 1 to about 10% by weight of a cyanide vinyl compound. In exemplary embodiments, the monomer mixture comprises about 80 to about 89% by weight of (meth)acrylic acid alkyl ester, about 7 to about 15% by weight of an aromatic vinyl compound, and about 3 to about 7% by weight of a cyanide vinyl compound.

In exemplary embodiments, the reaction solution comprises about 87 to about 97% by weight of a monomer mixture and about 3 to about 13% by weight of a butadiene rubber. The resin prepared by the above method may comprise about 5 to about 20 parts by weight of a butadiene rubber and about 80 to about 95 parts by weight of a terpolymer of (meth) acrylic acid alkyl ester-aromatic vinyl-cyanide vinyl compound.

In exemplary embodiments, the reaction solution may further comprise about 5 to about 20 parts by weight of a solvent, about 0.01 to about 0.2 parts by weight of an initiator, and about 0.1 parts by weight to about 1 part by weight of a molecular weight control agent.

The butadiene rubber (B) may be polybutadiene, styrene-butadiene rubber or a combination thereof. The styrene-butadiene rubber may have 20% by weight or less of styrene, for example about 10% by weight or less of styrene.

The butadiene rubber may have a solution viscosity of about 25 to about 100 cps in a 5% styrene solution, for example about 40 to about 100 cps. If the amount of styrene is more than 20% by weight and the solution viscosity in a 5% styrene solution is less than 25 cps, the solution viscosity of the rubber may become lower and thus when preparing the thermoplastic resin by the continuous bulk polymerization, the rubber particle size may become smaller, so that low gloss characteristic can not be obtained. Further, if the solution viscosity in a 5% styrene solution is more than 100 cps, the rubber particle size may be larger than 10 μm, so that scratch resistance and impact strength may be deteriorated.

A rubber particle size of about 1 to about 10 μm may be obtained when the viscosity of butadiene rubber and the viscosity of the terpolymer of (meth)acrylic acid alkyl ester, aromatic vinyl compound, and cyanide vinyl compound in continuous phase are appropriate.

When a weight average molecular weight of the continuous phase is adjusted to become about 60,000 to about 150,000, a viscosity ratio between rubber phase and the continuous phase is appropriate. If a weight average molecular weight of the continuous phase is less than about 60,000, scratch resistance and impact strength may be deteriorated since the viscosity of rubber phase is too much greater than the viscosity of the continuous phase, and thus the rubber phase may have a particle size of greater than about 10 μm. On the contrary, if a weight average molecular weight of the continuous phase is more than about 150,000, low gloss characteristic may be deteriorated since the viscosity of the continuous phase is too much greater than the viscosity of the rubber phase, and thus the rubber phase may have a particle size of less than about 1 μm.

In order to control the conversion rate of the continuous phase, reaction rate and weight average molecular weight, about 0.01 to about 0.2 parts by weight, for example about 0.02 to about 0.1 parts by weight of a polymerization initiator may be added to 100 parts by weight of the reaction solution. If the amount of the polymerization initiator is more than about 0.2 parts by weight, conversion ratio, reaction temperature and molecular weight may not be efficiently controlled due to rapid polymerization, or the molecular weight of the resulting continuous phase may be markedly low. In addition, if the amount of the polymerization initiator is less than about 0.01, the reaction rate may rapidly decrease so that it is difficult to obtain the desired conversion rate.

Examples of the polymerization initiators may include without limitation 1,1-bis(t-butylperoxy)-2-methylcyclohexane, 1,1-bis(t-butylperoxy)cyclohexane, 2-bis(4,4-di-t-butylperoxy cyclohexane)propane, t-hexyl peroxy isopropyl monocarbonate, t-butyl peroxy maleic acid, t-butyl peroxy-3,5,5-trimethyl hexanoate, t-butyl peroxy laurate, 2,5-dimethyl-2,5-bis(m-toluoyl peroxy)hexane, t-butyl peroxy isopropyl monocarbonate, t-butyl peroxy 2-ethylhexyl monocarbonate, t-hexyl peroxybenzoate, 2,5-dimethyl-2,5-bis(benzoyl peroxy)hexane, t-butyl peroxy acetate, 2,2-bis(t-butyl peroxy)butane, t-butyl peroxy benzoate, n-butyl-4,4-bis(t-butyl peroxy) valerate and combinations thereof.

Further, molecular weight control agents such as t-dodecyl mercaptan, n-dodecyl mercaptan, and combinations thereof may be included into 100 parts by weight of the reaction solution in order to adjust the molecular weight of the continuous phase. The molecular weight control agent may be used in an amount of about 0.1 to about 1 part by weight, for example about 0.2 to about 0.6 parts by weight. If the amount of molecular weight control agent is less than about 0.1 parts by weight, low gloss characteristic may be deteriorated because the molecular weight of the continuous phase can become so high that the size of the rubber phase becomes small. If the amount of molecular weight control agent is more than about 1 part by weight, impact strength may be deteriorated because the molecular weight of the continuous phase can become so low that the size of the rubber phase becomes large Solvents may be used for efficient heat transfer and stirring of the reactants during polymerization process. Examples of the solvents may include, but are not limited to, ethylbenzene, xylene, toluene, methylethylketone, and the like, and combinations thereof. The solvents may be used in an amount of about 5 to about 20 parts by weight per 100 parts by weight of a reaction solution.

In an exemplary embodiment of the present invention, reactant in which a butadiene rubber dissolves in a monomer mixture may be continuously introduced into a continuous polymerization reactor including 2 or more of reactors linked in series and then kept in the reactors for a predetermined amount of time so as to polymerize.

In another exemplary embodiment, the plurality of reactors may comprise 2 to 5 reactors. In an exemplary embodiment, the plurality of reactors may comprise 2 to 4 reactors, and the conversion rate in each reactor may be about 15 to about 35%. In another exemplary embodiment, the plurality of reactors may comprise 3 to 5 reactors, and the conversion rate in each reactor may be about 15 to about 23%.

The polymerization temperature can range from about 90 to about 140° C., for example from about 100 to about 120° C., and residence time can range from about 0.5 to 4 hours, for example about 1 to 2.5 hours, for each reactor, although the present invention is not so limited.

The final conversion rate of the monomer mixture may be about 50 to about 70%. If the conversion rate of the monomer mixture is less than about 50%, the amount of the thermoplastic resin prepared per unit time may decrease, which is not sufficient for commercial applications. If the amount is more than about 70%, the viscosity of the resin can markedly increase so that it can be difficult to control reaction temperature and to transfer the product.

The rubber phase in a spherical form and the continuous phase prepared as described above are continuously discharged from the reactor.

The polymerization mixture discharged from the reactor can be separated into unreacted monomer, solvent, and polymerization product in a devolatilizing apparatus under conditions of high temperature and vacuum. The devolatilizing apparatus may be operated under conditions of about 180 to about 280° C. and about 10 to about 35 Torr. Then, the polymerization product can be pelletized to obtain a thermoplastic resin composition having scratch resistance and low gloss characteristic.

The thermoplastic resin composition of the present invention may have a pencil hardness of HB or more, a scratch width of about 310 μm or less measured by a ball-type scratch profile (BSP) test, and a gloss of about 60 or less measured using a 60 degree gloss meter.

In an exemplary embodiment, the thermoplastic resin composition of the present invention may have a pencil hardness of HB to about 3H, a scratch width of about 250 to about 310 μm measured by a ball-type scratch profile (BSP) test, and a gloss of about 40 to about 60 measured using a 60 degree gloss meter.

The invention may be better understood by reference to the following examples which are intended for the purpose of illustration and are not to be construed as in any way limiting the scope of the present invention, which is defined in the claims appended hereto.

EXAMPLES

Example 1

100 parts by weight of reaction solution comprising 92 parts by weight of a monomer mixture comprising 8% by weight of styrene, 4% by weight of acrylonitrile and 88% by weight of methyl methacrylate; and 8 parts by weight of butadiene rubber having a solution viscosity of 50 cps in 5% by weight of styrene solution is prepared. To the reaction solution, 10 parts by weight of ethyl benzene, 0.02 parts by weight of 1,1-bis(t-butyloxy)cyclohexane (1,1-bis(t-butylperoxy)cyclohexane), and 0.6 parts by weight of t-dodecyl mercaptan are added to prepare a reactant. The prepared reactant is fed into a continuous polymerization reactor including three reactors linked in series at 25 kg/hr, and the reactors are equipped with a jacket and thus reaction temperature is easily controlled. Reaction temperature is controlled for monomer conversion of each reactor to be 20%, and for final conversion to be 60% and thus for butadiene rubber content in a resulting thermoplastic resin to be 12.6%. The reaction temperature of each reactor is controlled to be maintained at about 100 to 120° C. to obtain the monomer conversion ratio. The reactant discharged from the reactors is continuously transferred to a devolatilizing apparatus to remove unreacted monomer and solvent under conditions of 240° C. and 20 Torr.

The polymerization product is then pelletized to obtain a thermoplastic resin, and the molecular weight, composition, and rubber size of a continuous phase of the resin are measured. Test specimens for physical properties are prepared by injection molding, and physical properties such as pencil hardness, BSP, gloss and Izod impact strength are measured. The results are shown in Table 1 and a TEM image of the thermoplastic resin prepared in Example 1 is shown in FIG. 1(a).

Example 2

Example 2 is conducted in the same manner as in the Example 1 except that a monomer mixture comprising 12% by weight of styrene, 5% by weight of acrylonitrile and 83% by weight of methyl methacrylate is used. The results are shown in Table 1 and a TEM image of the thermoplastic resin prepared in Example 2 is shown in FIG. 1(b).

Example 3

Example 3 is conducted in the same manner as in the Example 1 except that a styrene-butadiene rubber comprising 10% styrene and a solution viscosity of 30 cps in 5% by weight of styrene solution is used. The results are shown in Table 1 and a TEM image of the thermoplastic resin prepared in Example 3 is shown in FIG. 1(c).

Example 4

Example 4 is conducted in the same manner as in the Example 1 except that 10 parts by weight of a butadiene rubber having a solution viscosity of 50 cps in styrene solution of 5% by weight is used. The results are shown in Table 1 and a TEM image of the thermoplastic resin prepared in Example 4 is shown in FIG. 1(d).

Example 5

Example 5 is conducted in the same manner as in the Example 4 except that 0.3 parts by weight of t-dodecyl mercaptan is used. The results are shown in Table 1 and a TEM image of the thermoplastic resin prepared in Example 5 is shown in FIG. 1(e).

Comparative Example 1

15 parts by weight of butadiene rubber grafted with methyl methacrylate-styrene-acrylonitrile copolymer, 15 parts by weight of styrene-acrylonitrile copolymer, 55 parts by weight of polymethylmethacrylate and 15 parts by weight of methyl methacrylate-styrene-acrylonitrile terpolymer are mixed together and extruded through a twin screw extruder (L/D=29, Φ=45 mm) at a temperature of 220° C. to prepare a thermoplastic resin in pellets, and the composition and size of rubber phase for the pellets are measured.

The pellets are injection-molded into test specimens for measuring physical properties such as pencil hardness, BSP, gloss, and Izod impact strength. The results are shown in Table 2 and a TEM image of the thermoplastic resin prepared in Comparative Example 1 is shown in FIG. 1(f).

Comparative Example 2

Comparative Example 2 is conducted in the same manner as in the Example 1 except that a monomer mixture comprising 50% by weight of styrene, 10% by weight of acrylonitrile, and 40% by weight of methyl methacrylate are used. The physical properties are measured in the same manner as in Example 1. The results are shown in Table 1 and a TEM image of the thermoplastic resin prepared in Comparative Example 2 is shown in FIG. 1(g).

Comparative Example 3

Comparative Example 3 is conducted in the same manner as in the Example 1 except that a styrene-butadiene rubber comprising 25% by weight of styrene and a solution viscosity of 15 cps in 5% by weight of styrene solution is used. The physical properties are measured in the same manner as in Example 1. The results are shown in Table 1 and a TEM image of the thermoplastic resin prepared in Comparative Example 3 is shown in FIG. 1(h).

The physical properties of the test specimens are measured in accordance with the following methods (1) Molecular weight: The number average molecular weight, weight average molecular weight, and molecular weight distribution are analyzed by gel permeation chromatography (GPC) using column LF-804 manufactured by Waters Corporation, tetrahydrofuran as an eluent, and polystyrene standards.

(2) Contents of component: The contents of oxygen and nitrogen in the resin are measured using Flash EA 1112 manufactured by Thermo Finnigan Corporation and then the content of each component is calculated using the molecular weight of the monomer.

(3) Rubber phase particle size: The volume average particle size is measured using a Malvern Mastersizer S Ver. 2.14 and secondarily a TEM image is obtained by applying $RuO_4$ staining on the rubber phase.

(4) Pencil hardness: The pencil hardness is measured for the specimens of L10×W10×T3 mm, after exposure at 23° C. and 50% of relative humidity for 48 hours in accordance with JIS K 5401. The scratch-resistance is measured by 3B, 2B, B, HB, F, H, 2H, 3H, etc. The higher the H value, the better the scratch resistance is. The higher the B value, the lower the scratch resistance is.

(5) Scratch resistance: Scratch resistance is measured by a ball-type scratch profile (BSP) test. The BSP is conducted by applying a scratch of a length of 10 to 20 mm onto resin specimens of L 50 mm×W 40 mm×T 3 mm at load of 1,000 g and a scratch speed of 75 mm/min, using a metal spherical tip with a diameter of 0.7 mm and measuring a profile of the applied scratch through a surface profile analyzer (XP-T) manufactured by Ambios Corporation. The scratch resistance is evaluated from a scratch width by the measured profile and the unit of the scratch width is µm. As the measured scratch width is decreased, the scratch resistance is increased.

(6) Gloss: The 60 degree gloss is measured for 3 mm of test specimens using BYK-Gardner Gloss Meter.

(7) Izod Impact Strength (kg-cm/cm): The Izod impact strength is measured in accordance with ASTM D256 using ⅛" thick specimens.

TABLE 1

| | Examples | | | | |
|---|---|---|---|---|---|
| | 1 | 2 | 3 | 4 | 5 |
| Composition of Monomer Mixture (%) (SM/AN/MMA) | 8/4/88 | 12/5/83 | 8/4/88 | 8/4/88 | 8/4/88 |
| Monomer content (PBW) | 92 | 92 | 92 | 90 | 90 |
| Rubber content (PBW) | 8 | 8 | 8 | 10 | 10 |
| Styrene content in rubber (%) | 0 | 0 | 10 | 0 | 0 |
| Solution viscosity of rubber (cps) | 50 | 50 | 30 | 50 | 50 |
| Initiator (PBW) | 0.02 | 0.02 | 0.02 | 0.02 | 0.02 |
| Molecular weight control agents (PBW) | 0.6 | 0.6 | 0.6 | 0.6 | 0.3 |
| (A) Continuous phase content (%) | 87.4 | 87.4 | 87.4 | 84.4 | 84.4 |
| (A) Weight average molecular weight of continuous phase | 100,000 | 120,000 | 95,000 | 96,000 | 86,000 |

TABLE 1-continued

|  | Examples | | | | |
| --- | --- | --- | --- | --- | --- |
|  | 1 | 2 | 3 | 4 | 5 |
| (A) Composition of continuous phase (%) (SM/AN/MMA) | 12/3/85 | 17/3/80 | 12/3/85 | 12/3/85 | 12/3/85 |
| (B) Rubber content (%) | 12.6 | 12.6 | 12.6 | 15.6 | 15.6 |
| (B) Rubber phase particle size (μm) | 2.3 | 3.5 | 1.6 | 5.4 | 4.2 |
| Pencil Hardness | F | F | F | HB | HB |
| BSP | 275 | 285 | 273 | 305 | 297 |
| Gloss | 51 | 46 | 58 | 42 | 45 |
| Impact Strength | 9.5 | 9.3 | 11.5 | 8.5 | 9.0 |

TABLE 2

|  | Comparative Example 1 | Comparative Example 2 | Comparatiive Example 3 |
| --- | --- | --- | --- |
| Composition of Monomer Mixture (%) (SM/AN/MMA) | — | 50/10/40 | 8/4/88 |
| Monomer content (PBW) |  | 92 | 92 |
| Rubber content (PBW) | — | 8 | 8 |
| Styrene content in rubber (%) |  | 0 | 25 |
| Solution viscosity of rubber (cps) | — | 50 | 15 |
| Initiator (PBW) | — | 0.02 | 0.02 |
| Molecular weight control agents (PBW) | — | 0.6 | 0.6 |
| (A) Continuous phase content (%) | 85 | 87.4 | 87.4 |
| (A) Weight average molecular weight of continuous phase | 110,000 | 105,000 | 107,000 |
| (A) Composition of continuous phase (%) (SM/AN/MMA) | 16/5/79 | 54/9/37 | 12/3/85 |
| (B) Rubber content (%) | 15 | 12.6 | 12.6 |
| (B) Rubber phase particle size (μm) | 0.2 | 13.5 | 0.45 |
| Pencil Hardness | F | 2B | F |
| BSP | 272 | 345 | 266 |
| Gloss | 95 | 35 | 88 |
| Impact Strength | 6.5 | 4.5 | 10 |

When the content of rubber phase and continuous phase (matrix), the size of rubber phase particle and the composition of continuous phase (matrix) are in the range of the present invention, it can be seen that pencil hardness of HB or more and good scratch resistance of 310 or less, and excellent low gloss characteristic can be obtained. Furthermore, it is possible to control the size of the rubber phase particle by controlling the amount of molecular weight control agents, the content of styrene in rubber, and the composition of the monomer mixture. Thus, the examples demonstrate that these elements are important factors which act to control scratch resistance and low gloss characteristic in the thermoplastic resin.

In contrast, the thermoplastic resin prepared through a twin screw extruder using small rubber phase particles as in Comparative Example 1 exhibits good scratch resistance but high gloss which is not desired in the present invention. Furthermore, Comparative Example 2 in which the composition of the monomer mixture for a continuous phase is outside of the range of the present invention, scratch resistance is deteriorated since the size of the rubber phase is large. In contrast, Comparative Example 3 in which styrene content in the rubber is 25% and solution viscosity of the rubber in 5% styrene solution is 15 cps shows increased gloss, because the viscosity of the rubber phase is so low that the size of the rubber phase becomes small.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

What is claimed is:

1. A thermoplastic resin composition having excellent low gloss characteristic and scratch resistance, the composition comprising:
    (A) about 80 to about 95% by weight of a continuous phase formed of a terpolymer of (meth)acrylic acid alkyl ester-aromatic vinyl-cyanide vinyl compound; and
    (B) about 5 to about 20% by weight of rubber particles as a dispersed phase, wherein said rubber particles are butadiene rubber particles with 0 wt % styrene monomer and wherein said rubber particles have an average particle diameter of about 3 to about 10 μm,
    wherein said terpolymer of (meth)acrylic acid alkyl ester-aromatic vinyl-cyanide vinyl compound (A) is a terpolymer 85 to 90% by weight of (meth)acrylic acid alkyl ester, about 5 to 12% by weight of an aromatic vinyl compound, and about 1 to about 10% by weight of a cyanide vinyl compound.

2. The thermoplastic resin composition of claim 1, wherein said terpolymer of (meth)acrylic acid alkyl ester-aromatic vinyl-cyanide vinyl compound (A) forms a continuous phase, and the butadiene rubber (B) forms a dispersed phase in the form of spherical particles.

3. The thermoplastic resin composition of claim 1, wherein said butadiene rubber has a solution viscosity of about 25 to about 100 cps in 5% styrene solution.

4. The thermoplastic resin composition of claim 1, wherein:
    said (meth)acrylic acid alkyl ester is methylmethacrylate, ethylmethacrylate, propyl methacrylate, butyl methacrylate, pentyl methacrylate, hexyl methacrylate, heptyl methacrylate, octyl methacrylate, methyl acrylate, ethyl acrylate, propyl acrylate, butyl acrylate, pentyl acrylate, hexyl acrylate, heptyl acrylate, octyl acrylate, or a combination thereof;
    said aromatic vinyl compound is styrene, α-methyl styrene, p-methyl styrene, or a combination thereof; and said cyanide vinyl compound is acrylonitrile, methacrylonitrile, ethacrylonitrile, or a combination thereof.

5. The thermoplastic resin composition of claim 2, wherein said continuous phase consists of said terpolymer of (meth) acrylic acid alkyl ester-aromatic vinyl-cyanide vinyl compound (A) having a weight average molecular weight of about 60,000 to about 150,000.

6. A method for preparing a thermoplastic resin composition having excellent low gloss characteristic and scratch resistance, the method comprising:
preparing a reaction solution by mixing a monomer mixture comprising about 70 to about 90% by weight of (meth)acrylic acid alkyl ester, about 5 to about 20% by weight of an aromatic vinyl compound, and about 1 to about 10% by weight of a cyanide vinyl compound with butadiene rubber particles with 0 wt % styrene monomer having an average particle diameter of about 3 to about 10 μm; and
polymerizing the reaction solution by continuously introducing the reaction solution into a plurality of serially connected reactors to a final monomer conversion of about 50 to about 70%.

7. The method of claim 6, wherein said reaction solution comprises about 87 to about 97% by weight of a monomer mixture and about 3 to about 13% by weight of a butadiene rubber.

8. The method of claim 6, wherein said butadiene rubber has a solution viscosity of about 25 to about 100 cps in 5% styrene solution.

9. The method of claim 6, wherein said plurality of reactors comprise 2 to 5 reactors.

10. The method of claim 6, wherein said reaction solution further comprises about 5 to about 20 parts by weight of a solvent, about 0.01 to about 0.2 parts by weight of an initiator, and about 0.1 to about 1 part by weight of a molecular weight control agent.

11. The thermoplastic resin composition of claim 1, wherein said thermoplastic resin composition has a pencil hardness of HB or more, a scratch width of about 310 μm or less measured by a ball-type scratch profile test, and a gloss of about 60 or less measured using a 60 degree gloss meter.

12. The thermoplastic resin composition of claim 1, wherein said butadiene rubber has an average particle diameter of about 3 to about 6 μm.

13. The thermoplastic resin composition of claim 1, comprising (A) about 85 to about 95% by weight of said terpolymer of (meth)acrylic acid alkyl ester-aromatic vinyl-cyanide vinyl compound; and (B) about 5 to about 15% by weight of said butadiene rubber.

14. The method of claim 6, wherein the monomer mixture comprises about 85 to about 90% by weight of (meth)acrylic acid alkyl ester.

15. The method of claim 14, wherein the monomer mixture comprises about 5 to 12% by weight of said aromatic vinyl compound.

16. The method of claim 6, wherein said thermoplastic resin composition has a pencil hardness of HB or more and a gloss of about 40 to 45 measured using a 60 degree gloss meter.

17. The thermoplastic resin composition of claim 1, wherein said thermoplastic resin composition has a pencil hardness of HB or more and a gloss of about 40 to 45 measured using a 60 degree gloss meter.

* * * * *